(12) United States Patent
Adams et al.

(10) Patent No.: US 8,998,166 B2
(45) Date of Patent: Apr. 7, 2015

(54) COMBINATION DIAPHRAGM PISTON ACTUATOR

(71) Applicant: Vetco Gray Inc., Houston, TX (US)

(72) Inventors: Keith M. Adams, Katy, TX (US); Lloyd R. Cheatham, Lake Jackson, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 71 days.

(21) Appl. No.: 13/679,553

(22) Filed: Nov. 16, 2012

(65) Prior Publication Data

US 2014/0138564 A1   May 22, 2014

(51) Int. Cl.
| | |
|---|---|
| F16K 31/00 | (2006.01) |
| F16K 31/126 | (2006.01) |
| F15B 15/10 | (2006.01) |
| F15B 15/14 | (2006.01) |

(52) U.S. Cl.
CPC ............. F16K 31/1262 (2013.01); F15B 15/10 (2013.01); F15B 15/1447 (2013.01); F15B 15/1457 (2013.01)

(58) Field of Classification Search
USPC .............. 251/61.4, 61.2, 61.1, 63.5, 63.6
See application file for complete search history.

(56) References Cited

U.S. PATENT DOCUMENTS

| | | | |
|---|---|---|---|
| 2,953,166 A | 9/1960 | Carlson, Jr. | |
| 3,115,068 A | 12/1963 | Lofink | |
| 3,293,992 A | 12/1966 | Baumann | |
| 3,881,400 A | 5/1975 | Lewis | |
| 3,958,592 A | 5/1976 | Wells | |
| 3,993,284 A | 11/1976 | Lukens | |
| 4,135,546 A | 1/1979 | Morrison | |
| 4,187,764 A | 2/1980 | Cho | |
| 4,354,425 A | 10/1982 | Bruton | |
| 4,424,738 A | 1/1984 | Leighton | |
| 4,480,811 A | 11/1984 | Card | |
| 4,527,769 A | 7/1985 | Stogner | |
| 4,585,207 A | 4/1986 | Shelton | |
| 4,967,785 A | 11/1990 | Young | |
| 5,067,392 A | 11/1991 | Gautier | |
| 5,499,648 A * | 3/1996 | Powell et al. .............. | 137/15.24 |
| 6,050,541 A | 4/2000 | Chatufale | |
| 6,089,531 A | 7/2000 | Young | |
| 6,854,704 B1 * | 2/2005 | Young .......................... | 251/61.4 |
| 2003/0034465 A1 | 2/2003 | Adams et al. | |

FOREIGN PATENT DOCUMENTS

| | | |
|---|---|---|
| EP | 0486824 A1 | 5/1992 |
| FR | 1195213 A | 11/1959 |

OTHER PUBLICATIONS

PCT Search Report and Written Opinion dated Mar. 3, 2014 from corresponding Application No. PCT/US2013/067666.

* cited by examiner

*Primary Examiner* — John Bastianelli
*Assistant Examiner* — Andrew J Rost
(74) *Attorney, Agent, or Firm* — Bracewell & Giuliani LLP

(57) ABSTRACT

An actuator for operating a linear valve, such as a gate valve, includes a sealing plate that extends across the diameter of a housing. A diaphragm is located on, and fully supported by, the plate. When pressure media urges the diaphragm and sealing plate downward, the sealing plate urges a step downward to actuate a valve. A hub and an annular support plate can be assembled to form the plate, and the plate can be different sizes by selecting different sized annular support plates.

20 Claims, 5 Drawing Sheets

COMBINATION DIAPHRAGM PISTON ACTUATOR

BACKGROUND OF THE INVENTION

1. Field of the Invention

The present invention relates in general to valves for mineral recovery wells, and in particular to actuators to actuate valves.

2. Brief Description of Related Art

A gate valve is a valve having a body and a bore through the body. A gate is positioned transverse to the body, and moves linearly to obstruct flow through the bore or allow flow through the bore. Some gates have an aperture that aligns with the bore to allow flow. The gate can be normally open, and thus the gate is closed when it is moved linearly to push the aperture out of alignment with the bore. Alternatively, a gate can be normally closed, and thus the gate is opened when it is moved linearly to position the aperture in alignment with the bore. Regardless of whether the gate is normally open or normally closed, the gate is moved, or actuated, by a valve actuator.

Actuators can be a hydraulic, piston type actuator, or actuators can be a pneumatic piston or diaphragm type actuator. In conventional diaphragm actuators, a diaphragm is moved in response to pressure media, such as gas or other fluids, urging the diaphragm toward the gate valve. The diaphragm is partially supported by a support plate. When the diaphragm is urged downward, it urges the support plate downward, which then transfers the downward force via a stem to the gate of the gate valve. The outer diameter ("OD") of the diaphragm support plate does not extend to the inner diameter ("ID") of the housing in which the diaphragm is positioned, so a portion of the diaphragm hangs over the edge of the support plate and is thus unsupported. As one of skill in the art will appreciate, unsupported regions of a diaphragm are more prone to failure and require a thick and reinforced diaphragm to be able to withstand the force exerted by the pressure media.

SUMMARY OF THE INVENTION

This application discloses embodiments of a valve actuator that is alternatively configurable for use as a diaphragm actuator, a piston actuator, or a dual or combination diaphragm and piston actuator. In various embodiments, the actuator includes modular components that are usable in one or more modes of use of the actuator; that can be exchanged for differently sized or configured components; and/or that can interface with differently sized or configured components. Embodiments herein provide significant performance, manufacturing, assembly, cost, and other advantages, such as described below.

More specifically, in an embodiment, the valve actuator is a pneumatic valve actuator usable to actuate valves, such as gate valves. The valve actuator is configurable to use a diaphragm; or piston pressure; or both a diaphragm and piston pressure. Embodiments herein allow the manufacture of common actuator parts that can be used in multiple pneumatic actuator applications. Additionally, embodiments provide an operator with flexibility to use a diaphragm, a piston, or a dual seal actuator to actuate a valve.

In an embodiment, a pressure member of the valve actuator comprises a base plate that can be used interchangeably on both diaphragm and piston actuators. The plate has a threaded OD to which an outer sealing arm is attached. The sealing arm provides a support member for the diaphragm and/or piston seal groove. The sealing arm size can be chosen from multiple sealing arms depending on the actuator force required to operate a given gate valve.

The diaphragm is completely supported, by the pressure member, during the complete opening and closing cycle of the actuator. This complete support eliminates ballooning effects that occur with conventional diaphragm retainer plate actuators. The diaphragm is designed to be as compact as possible and allow the maximum stroke possible with a diaphragm design. This actuator allows for a combined diaphragm and piston, or a diaphragm or piston actuator to be manufactured from one basic set of common components.

In some embodiments of the actuator, the actuator housing is manufactured from castings, which allows for higher strength material to be used and can be NACE certified if required by application. In some embodiments, there is no welding on the internal surfaces of the housing.

The diaphragm is completely supported when it is urged downward by the pressurized media, and thus allows the actuator operating media pressure to be increased above other conventional designs. Conventional actuators are typically limited to less than 200 psig, and often less than 150 psig. By supporting the diaphragm as the pressure member moves to the fully down position, the pressure of the actuator media can be as high as 250 psig without damaging the diaphragm. In embodiments, the pressure can be greater than 250 psig. This allows maximum operating coverage to meet API 6A SSV design requirements when implementing smaller actuators because a smaller actuator, operating at greater pressure, exerts the same operating force on the gate valve as would a conventional large actuator operating at a lower pressure.

Traditional diaphragm actuators do not have fully supported diaphragms. Due to this lack of support, traditional diaphragm actuators allow at least the unsupported portion of the diaphragm to balloon under the support plate, thus reducing effective pressure area. The fully supported diaphragm allows maximum effective area of the pressurized area. By way of example, a traditional 12" diaphragm actuator with a 1¼" top shaft would have an approximate effective pressure area of 90 sq. in. An exemplary embodiment of a 12" fully supported actuator, with a 1¼" top shaft, would have an approximate effective pressure area of 112 sq. in.

A traditional diaphragm actuator typically has a maximum operating pressure of 150 psig. Therefore an approximate output force of the exemplary traditional 12" diaphragm actuator would be approximately 13,500 pounds of force. Embodiments of a fully supported actuator can have a maximum operating pressure of 250 psig. Therefore, an approximate output force of embodiments of a 12" diaphragm fully supported actuator, operated at 250 psig, is in the range of approximately 25,000-30,000 pounds of force. An approximate output force of embodiments of a 12" diaphragm fully supported actuator, operated at 250 psig, is in the range of approximately 27,000-29,000 pounds of force. An approximate output force of embodiments of a 12" diaphragm fully supported actuator, operated at 250 psig, is approximately 28,000 pounds of force. As one of skill in the art will appreciate, the amount of force will vary depending on specific actuator geometry, manufacturing tolerances, and materials of construction.

Embodiments of an apparatus for actuating a valve include a cylindrical housing having a valve end, a cap end, and a sidewall defining an inner diameter ("ID") of the housing, a cap connected to the cap end of the housing with an inlet located in the cap, and a plate positioned within the housing. The plate has a center portion and an outer diameter ("OD") that slidingly engages the ID of the housing, the OD of the plate being located axially nearer the valve end of the housing than the center portion, the plate moving between an extended position and a retracted position in response to pressure media from the inlet, the plate being nearer the valve end in the extended position than in the retracted position. Embodiments can also include a retainer connected to the plate, the retainer operable to engage an inner diameter orifice of a diaphragm, and a down stop in contact with the plate, the down stop being urged toward the valve end of the housing when the plate moves toward the extended position, and the down stop being operable to be connected to a valve stem for actuating a valve.

Embodiments can further include an annular sealing ring between the ID of the sidewall and the plate. Embodiments can include a diaphragm covering the plate and extending to the cap end, the diaphragm and cap defining a pressure chamber. In embodiments, the diaphragm does not extend axially past the plate in each of the retracted and extended positions.

In embodiments, the plate can include a hub having a threaded outer diameter and a sealing plate having a threaded inner diameter, the sealing plate threadingly engaging the hub. The diaphragm can be fully supported by the plate and the housing when the sealing plate is in the extended position. Embodiments can also include an indicator stem connected to the plate and protruding through an orifice of the cap.

In embodiments, the plate can have a convex surface and a concave surface, each of the convex and concave surfaces facing the cap and the concave surface being spaced radially outward from the convex surface. Embodiments can also include a diaphragm, the diaphragm being in contact with each of the convex and concave surfaces when the plate is in the extended position. In embodiments, the plate does not extend axially past the cap end of the cylindrical body.

Embodiments of the invention include a method for actuating a valve. The method can include the steps of providing a valve actuator, the valve actuator having a cylindrical housing, a support disk that slidingly engages an inner diameter surface of the cylindrical housing, a cap sealingly engaging a first end of the cylindrical housing, the housing, support disk, and cap defining a pressure chamber; connecting a diaphragm to the support plate and the first end of the cylindrical housing, the diaphragm spanning the diameter of the cylindrical housing and being supported by the support disk across the diameter of the support disk; and pressurizing the pressure chamber to cause the support disk to move from a first position to a second position, the second position being further away from the first end than the first position, to cause a stem connected to the support plate to move downward to actuate the valve.

In embodiments of the method, substantially all of the diaphragm is in contact with the support disk and the housing. Embodiments can also include the step of providing a dynamic seal between the inner diameter surface and an outer diameter of the support disk. The support disk can include a base plate having a threaded outer diameter and an annular support arm having a threaded inner diameter, wherein step (a) comprises connecting the support arm to the base plate.

Embodiments of the method can also include the step of determining the diameter of the diaphragm so that the diaphragm is in contact with substantially all of an exposed surface of the support disk in the second position.

Embodiments of a system for actuating a valve can include an annular hub having an outer diameter; a retainer concentrically connected to the hub; an indicator stem axially extending from the retainer in a first direction; and an actuator stem axially extending from the hub in a second direction, the actuator stem passing through a bonnet and being operable to move a component in a valve when the stem moves axially between a first position and a second position. Embodiments of the system also include a first housing having a first inner diameter, a first cap sealingly connectable to the first housing, and a second housing having a second inner diameter and a second cap sealingly connectable to the second housing, each of the first and second housing being individually connectable to the bonnet; and a first annular support plate operable to slidingly engage the first inner diameter of the first housing and a second annular support plate operable to slidingly engage the second inner diameter of the second housing, each of the first and second annular support plates being connectable to the base plate. In embodiments, each of the first and second annular support plates can sealingly engage the inner diameters of the first and second housings, respectively.

Embodiments of the system also include a first diaphragm, the first diaphragm being fully supported, in the axial direction, by the base plate and the first annular support arm. In embodiments of the system, the first diaphragm forms a seal between the retainer and the base plate and forms another seal between the first cap and the first annular housing.

In embodiments of the system, the hub includes threads on an outer diameter surface and each of the first and second annular support plates include threads on an inner diameter surface so that each of the first and second annular support arms can threadingly engage the hub.

Other embodiments of the invention include a system of actuators comprising a first actuator and a second actuator that is dimensioned differently (e.g., is larger or smaller) than the first actuator. The first actuator includes a first set of components and a second set of components. The second actuator includes a third set of components and a fourth set of components. The first and third sets of components are common to the first and second actuators. For instance, the first and third sets of components include an identically sized, composed, and/or designed hub, down stop, stem, and/or spring. The second and fourth sets of components differ between the first and second actuators. For instance, an outer plate of the first actuator is dimensioned differently than an outer plate of the second actuator. The components that differ between the second and fourth sets of components include, for example, a plate or outer plate, a housing, a cap, and/or a diaphragm.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
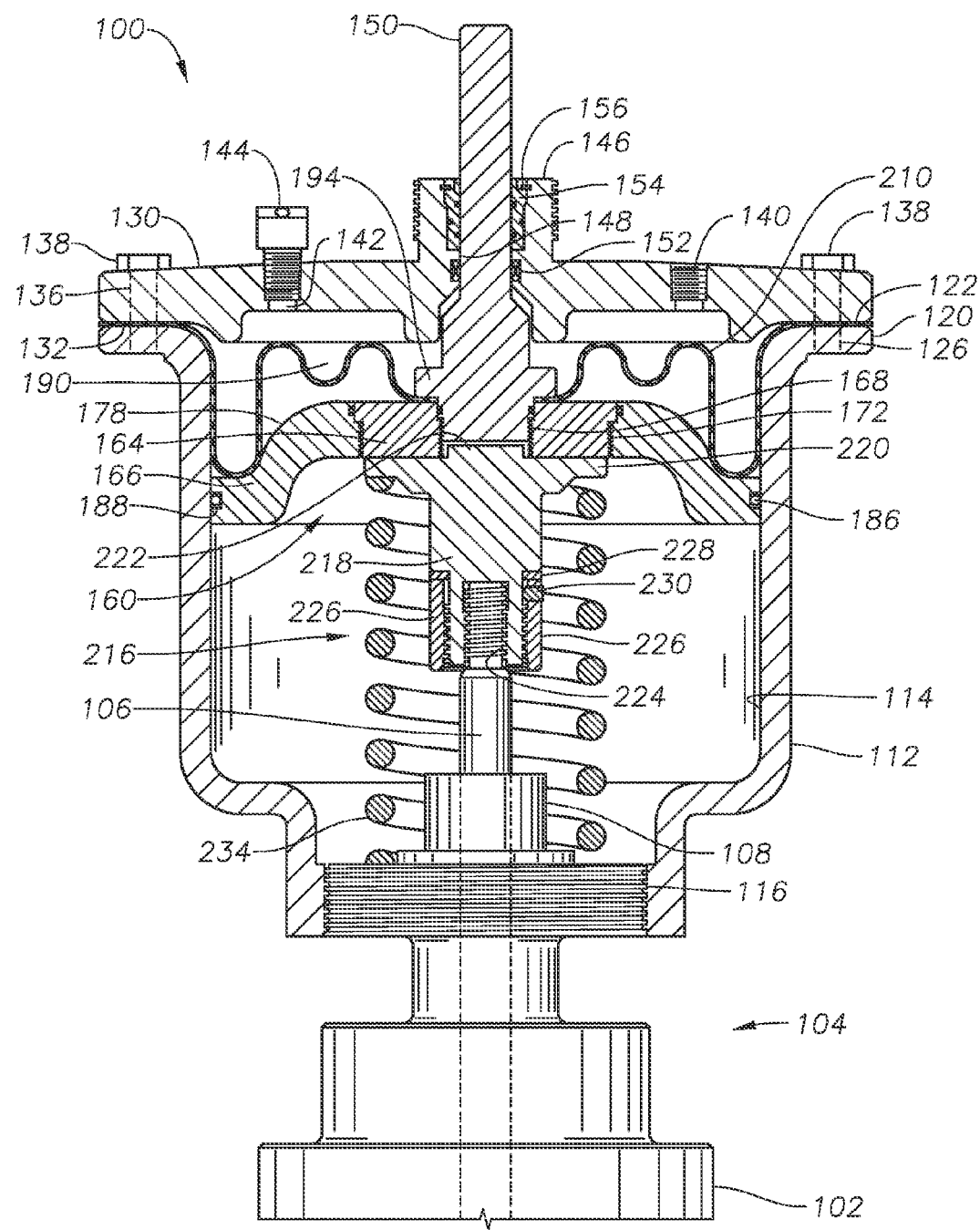
FIG. 1 is a side sectional environmental view of an embodiment of a dual seal piston diaphragm actuator.
Figure 2:
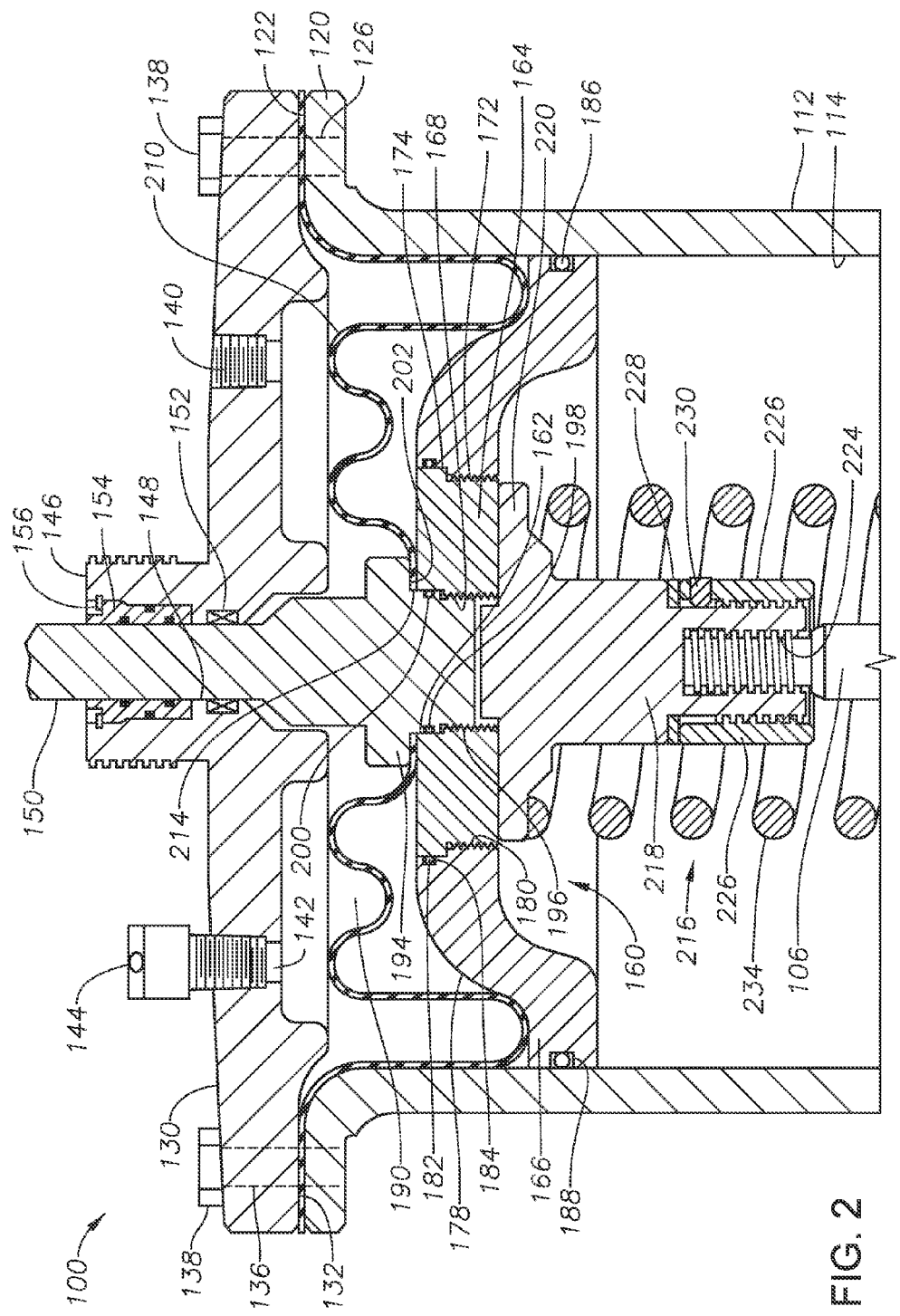
FIG. 2 is an enlarged view of the side sectional environmental view of FIG. 1.

Referring to FIGS. 1 and 2, actuator 100 is shown. Actuator 100 is used to open or close valve 102, to which actuator 100 is connected. As one of skill in the art will appreciate, valve 102 can be a gate valve or any other type of valve that is actuated by the extension of a linear member. Bonnet 104 is connected to the body of valve 102. Stem 106 passes through bonnet 104 and packing retainer 108. Actuator 100 is used to actuate valve 102 by urging stem 106 downward toward valve 102.

Actuator housing 112 includes a cylindrical body having an inner diameter ("ID") surface 114. Housing 112 is manufactured from any of a variety of techniques including, for example, stamping, extrusion, and casting. In embodiments, housing 112 is free of welds or seams on interior surfaces such as ID surface 114. Housing 112 can be manufactured from NACE certified materials.

Actuator housing 112 is connected to bonnet 104 by way of connector 116. Connector 116 is shown as a threaded connection, but other types of connectors can be used. At the opposite end of housing 112, from connector 116, is flange 120, which flares outward from housing 112. Flange 120 has an upward facing surface 122, which is a smooth surface for forming a seal. A plurality of bolt holes 126 are spaced apart around flange 120.

Cap 130 is connected to housing 112. Cap 130 is an annular plate having an outer diameter approximately equal to the outer diameter of flange 120. Sealing surface 132 is a generally smooth, downward facing surface of cap 130 that aligns with upward facing surface 122 of flange 120. A plurality of bolt holes 136 are spaced apart around cap 130 to align with bolt holes 126. Cap bolts 138 are passed through bolt holes 136 to threadingly engage bolt holes 126 to secure cap 130 to housing 112. Other configurations can be used to secure cap 130 to housing 112, such as bolts that are inserted through bolt holes 126 to threadingly engage bolt holes 136, bolts that pass through both members and are secured with nuts (not shown), clamps (not shown), or collars (not shown).

Inlet 140 is an orifice through cap 130 and is spaced inwardly from sealing surface 132. Inlet 140 is connected to a pressurized media fluid source (not shown) that can selectively provide pressurized media fluid through inlet 140. Pressurized media is typically a fluid such as compressed air, nitrogen, well gas, or other types of gas or liquid. Orifice 142 is a second opening through cap 130. Relief device 144, shown in orifice 142, is a pressure relief device that will open to relieve pressure in housing 112 should the pressure exceed a predetermined value. As one of skill in the art will appreciate, relief device 144 can be one of a variety of devices to relieve an overpressure situation, such as a pressure relief valve, a rupture disk, or a controlled valve.

Indicator housing 146 is a housing that includes indicator orifice 148 for receiving indicator stem 150. Indicator stem 150 is a cylindrical shaft that protrudes through cap 130. Bearing 152 is a bearing surface on an ID of indicator orifice 148 for guiding stem 150. Sealing assembly 154 is a seal that dynamically seals around indicator stem 150. As one of skill in the art will appreciate, sealing assembly 154 includes a snap ring 156, or other retainer (not shown), to hold sealing assembly 154 in position in indicator housing 146. Alternatively, sealing assembly 154 can be a sealing cartridge, a v-shaped lip seal with an o-ring, or other types of seals for dynamically sealing around a shaft.

Plate 160 is an annular plate that spans the inner diameter of housing 112 and forms a dynamic seal against ID surface 114 of housing 112. Plate 160 includes a central bore 162. The surface of plate 160 has a contour such that the radially outward portions are axially below the radially inward portions. As shown in FIGS. 1 and 2, the outer diameter region of the plate is located axially nearer the valve end of the housing than the central portion of the plate. In embodiments, plate 160 has an upward facing convex surface and an upward facing concave surface, with the concave surface being spaced radially outward from the convex surface.

In the embodiment shown in FIGS. 1 and 2, plate 160 includes hub 164 and outer plate 166. Hub 164 includes central bore 162, having ID threads 168 on the ID surface. Hub 164 also includes a sealing surface on an ID of central bore 162. The outer diameter of hub 164 includes OD threads 172 and OD sealing surface 174.

Outer plate 166 is an annular ring that connects to hub 164, such that plate 160 includes outer plate 166 and hub 164. Upper surface 178 of outer plate 166 slopes downward and outward, with a generally convex shape, and then extends horizontally to ID surface 114. The ID bore of outer plate 166 includes ID threads 180 for threadingly engaging OD threads 172 of hub 164. Seal 182 is positioned in seal groove 184 on the bore of outer plate 166, and sealingly engages OD sealing surface 174 of hub 164. Sidewall seal 186 is positioned in groove 188 located on an outer diameter of outer plate 166, and thus is located on an outer diameter of plate 160. Sidewall seal 186 sealingly engages ID surface 114 of housing 112 to provide a dynamic seal between ID surface 114 and plate 160. In embodiments, a wear ring (not shown in FIG. 1) can be positioned in groove 188. As one of skill in the art will appreciate, a wear ring will reduce the friction between the outer diameter of plate 160 and ID surface 114 of housing 112. The wear ring (not shown in FIG. 1) does not have the same sealing properties as sidewall seal 186.

The space bounded by housing 112, plate 160, and cap 130 is defined as a pressure chamber 190. Fluid introduced through inlet 140 results in an increase in pressure, which causes plate 160 to move downward.

Retainer 194 is detachably connected to the center of plate 160. In the embodiment shown, threads 196 on an outer diameter of retainer 194 threadingly engage ID threads 168 of hub 164. Retainer 194 includes a seal 198, positioned in a seal groove 200 on an OD surface, to sealingly engage central bore 162 of hub 164. Retainer 194 includes downward facing shoulder 202 located axially above seal groove 200. The outer diameter of shoulder 202 is greater than the inner diameter of bore 162. Retainer 194 does not extend the entire axial length of bore 162 so that a lower portion of bore 162 is open.

Indicator stem 150 extends upward from retainer 194. As one of skill in the art will appreciate, stem 150 can be inserted through a bore (not shown) of retainer 194. In such embodiments, one or more seals are located between an outer diameter of stem 150 and in inner diameter of retainer 194. Alternatively, indicator stem 150 and retainer 194 can be a monolithic member. Other techniques of connecting indicator stem 150 to retainer 194 can be used. In embodiments wherein the indicator stem passes upward through a central bore of retainer 194, a bore (not shown) can be located in a lower end of the stem.

Diaphragm 210 is a flexible diaphragm extending at least from ID surface 114 to retainer 194. As shown in FIGS. 1 and 2, diaphragm 210 is positioned between sealing surface 132 of cap 130 and surface 122 of flange 120. Bolt hole openings can be spaced apart around diaphragm 210, in alignment with cap bolts 138, so that cap bolts 138 pass through diaphragm 210 when it is positioned between cap 130 and flange 120. Cap bolts 138 are torqued to urge each sealing surface toward diaphragm 210. Diaphragm 210, thus, acts as a seal by sealingly engaging each of the sealing surfaces 132, 122.

An inner diameter orifice 214 is located at the center of diaphragm 210. The lower portion of retainer 194 passes through orifice 214 to engage threads 168 of central bore 162. The surfaces of diaphragm 210 are positioned between shoulder 202 of retainer 194 and plate 160. As shown in FIGS. 1 and 2, an upward facing surface of hub 164 sealingly engages a lower surface of diaphragm 210, and the downward facing surface of shoulder 202 sealingly engages an upper surface of diaphragm 210. As retainer 194 is tightened toward plate 160, diaphragm 210 is compressed between them. When diaphragm 210 is in position, pressure chamber 190 is defined by diaphragm 210 and cap 130.

Figure 3:
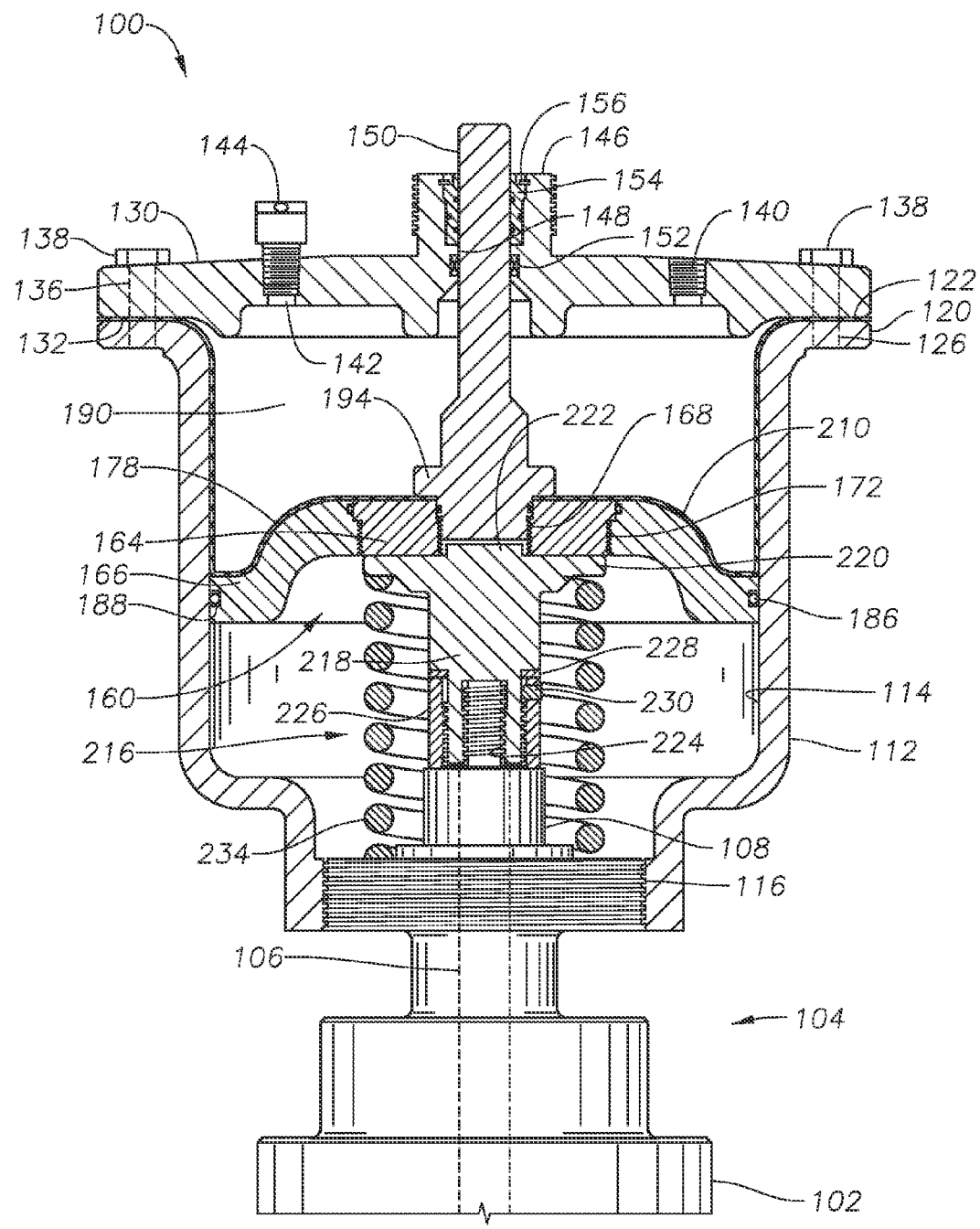
FIG. 3 is a side sectional environmental view of the embodiment of FIG. 1, showing the plate in the down position.

Referring now to FIG. 3, diaphragm 210 is fully supported by plate 160 and housing 112. In particular, a solid member is in contact with substantially all of diaphragm 210 such that the solid members prevent diaphragm 210 from ballooning outward in response to pressure media. Plate 160 supports the underside of diaphragm 210 across the entire inner diameter of housing 112. The ID surface 114 of housing 112 supports the sides of diaphragm 210. When pressure media in pressure chamber 190 exerts force against diaphragm 210 and plate 160 is in the down position, there is an absence of unsupported areas of diaphragm 210. The portion of diaphragm 210 that is inward from inner diameter surface 114 is supported by plate 160. Because diaphragm 210 is fully supported, it can withstand higher pressure in pressure chamber 190 than an unsupported diaphragm could withstand. Embodiments can have an actuator operating pressure higher than conventional unsupported diaphragms, which may be limited to 150 psig. Furthermore, diaphragm 210 can have an absence of fiber reinforcement and can be thinner than a conventional diaphragm.

The diameter of diaphragm 210 is determined, during the design process, such that when plate 160 is in the down position, diaphragm 210 is generally smooth against ID surface 114 and against the top surface of plate 160. In other words, diaphragm 210 is flush against ID surface 114 and the top surface of plate 160 such that there is an absence of gaps between diaphragm 210 and those surfaces. When plate 160 moves to the up position, diaphragm 210 can move so that there are gaps between the top surface of plate 160 and portions of diaphragm 210, which in turn may give diaphragm 210 a wavelike cross-sectional appearance.

Referring back to FIG. 1, down stop 216 is a cylindrical member for transmitting axial force between plate 160 and stem 106. Down stop 216 includes cylindrical body 218 and shoulder 220 extending therefrom. The upward facing surface of shoulder 220 contacts the downward facing surface of plate 160. Nipple 222 extends axially from the upper end of down stop 216. When actuator 100 is assembled, nipple 222 is positioned in bore 162 of hub 164, thus concentrically aligning both members. In embodiments wherein the indicator stem (not shown) passes upward through a bore in hub 164, and a recessed bore (not shown) is located at the lower end of such indicator stem, nipple 222 can engage the bore (not shown) on the lower end of the stem.

The lower end of down stop 216 includes threaded bore 224, which has threads on an ID surface, for threadingly engaging a threaded end of stem 106. As one of skill in the art will appreciate, the connection between down stop 216 and stem 106 can be any of various types of connections and is not limited to threaded connections. The outer diameter of the lower end of down stop 216 includes threaded collar 226 and can include any number of spacer rings 228. Threaded collar 226 contacts another member, such as packing retainer 108, located at the lower end of housing 112, to stop the further downward travel of down stop 216. Threaded collar 226 is adjusted so that it stops downward movement, and thus stem 106, at the appropriate position to completely open or completely close valve 102. Spacer rings 228 can be added or removed so that an opening of the gate (not shown) of gate valve 102 is properly aligned with a passage (not shown) of gate valve 102. Set screw 230 is used to hold threaded collar 226 in position.

Spring 234 surrounds down stop 216 and at least a portion of stem 106, and generally extends from the top of bonnet 104 to the downward facing surface of shoulder 220. Spring 234 is compressed as plate 160 moves from the upper position to the lower position. When fluid pressure from inlet 140 is reduced, spring 234 urges plate 160 up, away from valve 102. As one of skill in the art will appreciate, fluid force within valve 102 can act on stem 106 inside of valve 102 to urge stem 106 upward. Spring 234 and the upward force on the stem 106 can work together or independently to move plate 160 up.

The amount of downforce exerted by actuator 100 on valve 102 is dependent upon the pressure of the pressure media introduced through inlet 140 and acting upon the surface area of plate 160, as well as the amount of surface area of plate 160. Because plate 160 fully supports diaphragm 210, the surface area of diaphragm 210 upon which the pressure media acts is generally the same as the surface area of plate 160. An operator can change the amount of downforce exerted by actuator 100 by substituting a larger or smaller plate 160 and housing 112. To increase the downforce, for example, outer plate 166 is replaced with a larger outer plate 166 to increase the surface area of plate 160. Other components will also be replaced to accommodate the replacement outer plate 166.

To change the downforce exerted by the embodiment shown in FIG. 1, outer plate 166 is removed from hub 164 and an outer plate 166 having the same ID, but a different OD, is installed on hub 164. Housing 112 is substituted for a housing having an inner diameter that corresponds to the outer diameter of the newly installed outer plate 166. Cap 130 is similarly replaced with a cap 130 with a size that corresponds to the newly installed housing 112. Finally, diaphragm 210 is replaced with a new diaphragm 210 that is sized appropriately for the new outer plate 166, housing 112, and cap 130. Other components, such as retainer 194, stem 150, and bonnet 104 do not need to be replaced when switching from one size to another. A valve actuator system can include a retainer 194, a stem 150, a bonnet 104, a hub 164, a spring 234, and a down stop 216. The system can also include a first set of interchangeable components that includes a first housing 112, a first plate 166, a first cap 130, a first outer plate 166, and a first diaphragm, each of the first set of interchangeable components being sized to operate with one another. The system can also include a second set of interchangeable components that includes a second housing 112, a second cap 130, a second outer plate 166, and a second diaphragm 210, each of the second set of interchangeable components being sized to operate with one another and being a different size than the first set of interchangeable components.

Another valve actuator system includes a bonnet 104, stem 106, spring 234, and down stop 216, connected to a valve 102. The system further includes a first and second actuator assembly. Each actuator assembly includes a housing 112, plate 160, cap 130, and inlet 140. The first actuator assembly has a smaller diameter than the second actuator assembly. Specifically, the housing 112, plate 160, and cap 130 each have a smaller diameter than the same type of components in the second actuator assembly. In embodiments that include a diaphragm 210 in the actuator assembly, the diaphragm in the first actuator assembly has a smaller diameter than the diaphragm 210 in the second actuator assembly.

In the event that an operator wants to operate the valve 102 with a greater amount of downforce, the first actuator assembly is disconnected from the pressurized media source and then removed from the bonnet 104—leaving at least the bonnet and stem connected to the valve. The spring 234 and down stop 216 may also remain in place. The second actuator assembly is then connected to the bonnet 104 and the pressurized media source. The actuator assembly is replaced as an assembly and individual components of the actuator assembly, such as the support plate 160, diaphragm 210, and cap 130, do not need to be removed from the assembly when the assembly is replaced on the bonnet 104. Alternatively, the system can include actuator assemblies having the same size components, and a worn or damaged actuator assembly can be replaced with another similarly sized actuator assembly.

Figure 4:
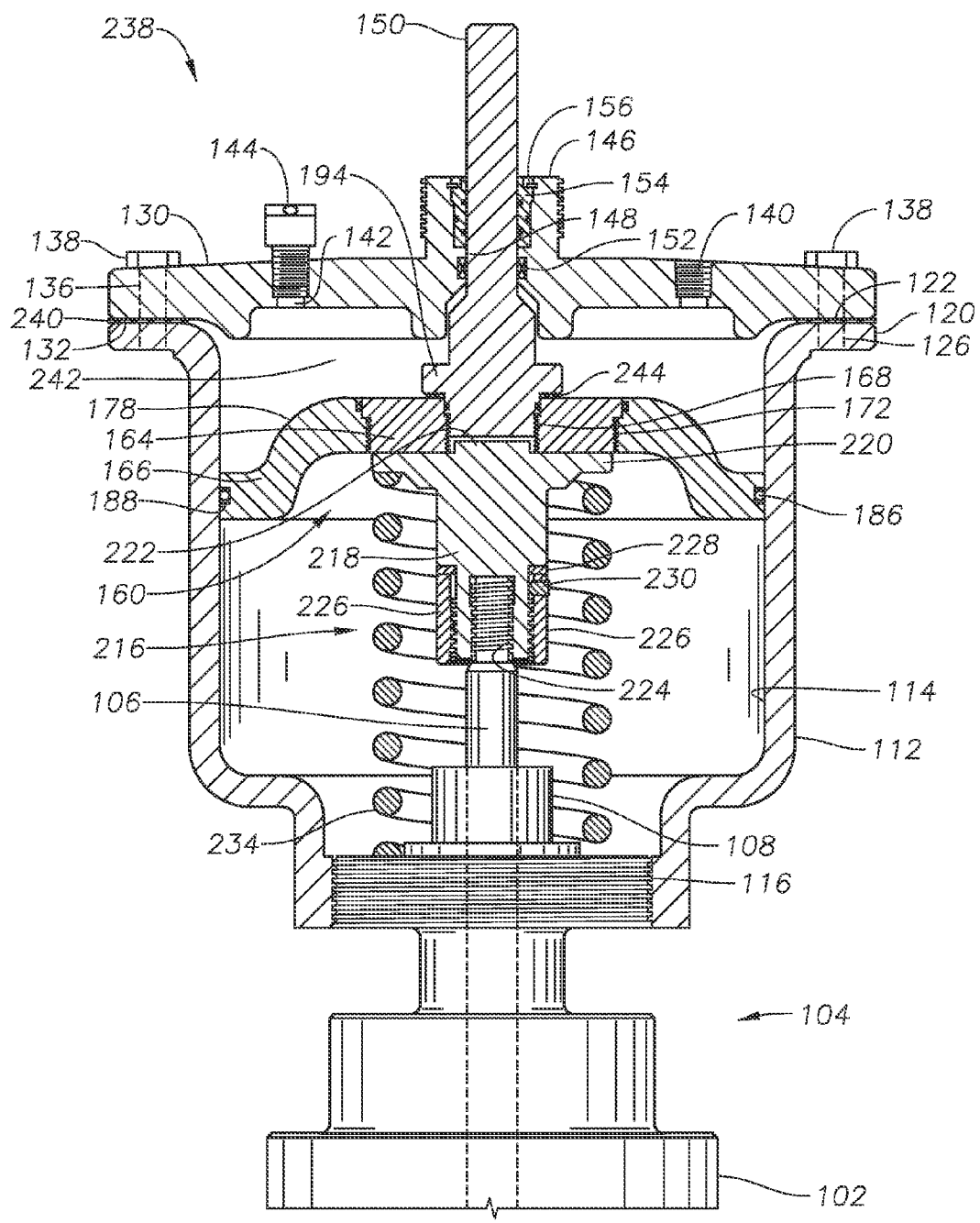
FIG. 4 is a side sectional environmental view of the embodiment of FIG. 1, showing the use of annular seals, in lieu of a diaphragm, to provide a seal between the housing and the cap.

Referring now to FIG. 4, using the same components as previously described, actuator 238 can be assembled without diaphragm 210. The dual nature of the assembly allows operators to run the actuator as a piston actuator without maintaining a second set of valves and parts. To operate actuator 238 without a diaphragm, seal ring 240 is positioned between housing 112 and cap 130. Sidewall seal 186 of outer plate 166 forms a seal against ID surface 114, thus defining pressure chamber 242 without the use of a diaphragm. Plate 160 can be a monolithic plate, or can be an assembly of hub 164 and annular outer plate 166. The seals such as seal 182 and seal 198 prevent fluid from leaking through plate 160, even though no diaphragm is used. Optionally, annular seal ring 244 can be positioned between retainer 194 and plate 160. As with other configurations, pressure media through inlet 140 urges plate 160 downward, thus causing stem 106 to move downward.

Figure 5:
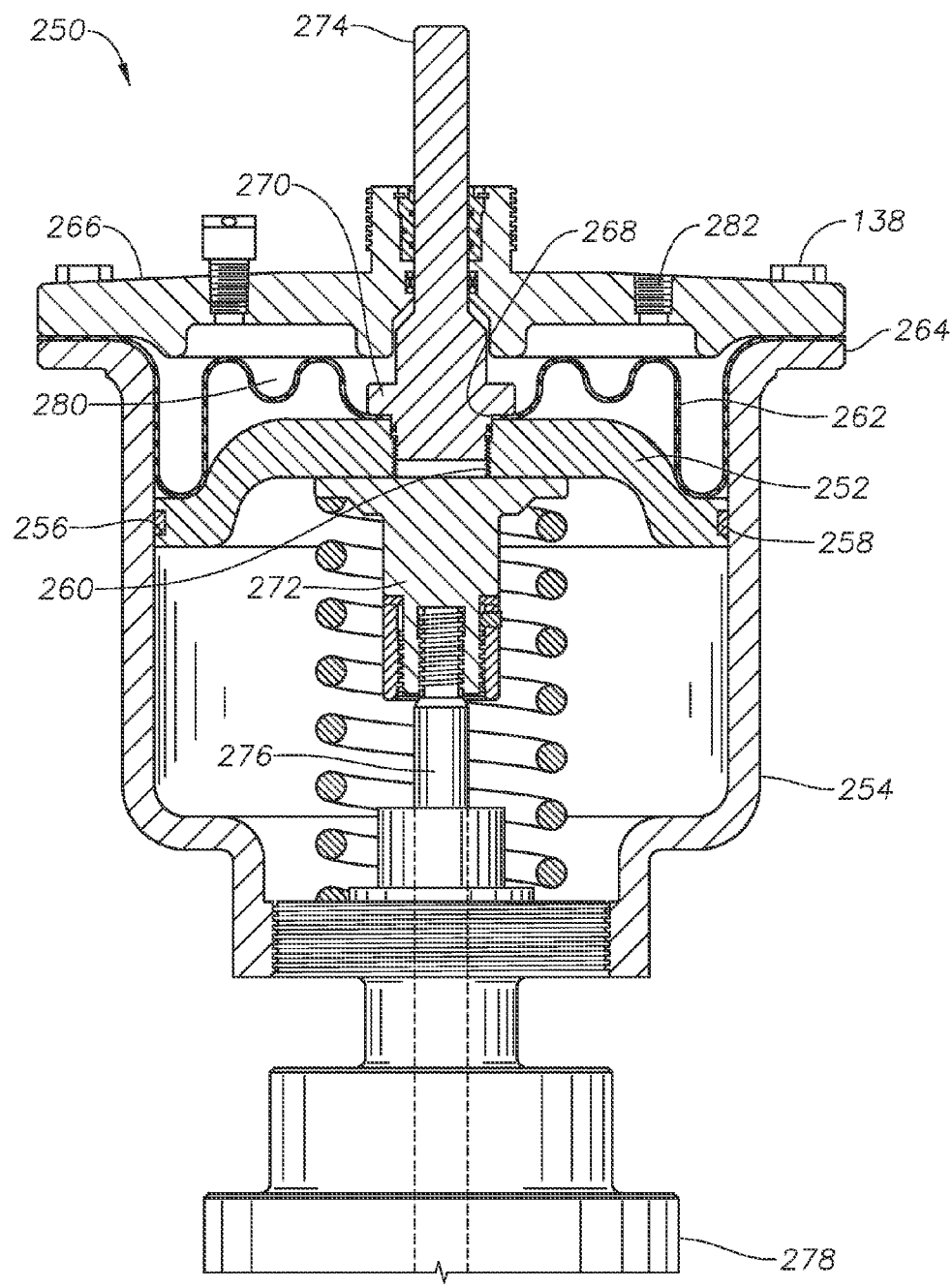
FIG. 5 is a side sectional environmental view of another embodiment of a supported diaphragm actuator having a single piece support plate.

Referring now to FIG. 5, valve actuator assembly 250 is shown. Valve actuator 250 includes plate 252 positioned in housing 254. Plate 252 is a plate spanning the inner diameter of housing 254. The outer diameter of plate 252 includes groove 256. Wear ring 258 is shown positioned in groove 256. Wear ring 258 slidingly engages the inner diameter surface of housing 254 as plate 252 moves between the up position and the down position. Wear ring 258 reduces the friction between plate 252 and housing 254, but does not necessarily provide a seal between those two members. Plate 252 has a central bore 260.

Diaphragm 262 is supported by plate 252. The outer diameter portion of diaphragm 262 is positioned between flange 264 and cap 266. Diaphragm 262 functions as a seal between flange 264 and cap 266. The inner diameter orifice 268 of diaphragm 262 provides sealing engagement between retainer 270 and plate 252.

Down stop 272 is positioned below plate 252. Down stop 272 can have a generally flat top surface and an absence of a nipple or protrusions where it engages plate 252. Because plate 252 extends all the way to the inner diameter of housing 254, it is radially restrained and, thus, cannot move radially away from the axis of housing 254, regardless of whether down stop 272 or indicator stem 274 provide radial restraint. Down stop 272 is connected to stem 276, which is connected to valve 778.

Pressure chamber 280 is a volume defined by cap 266, housing 254, and plate 252. Inlet 282 in cap 266 is connected to a pressure media source to selectively introduce pressure media into pressure chamber 280. Diaphragm 262 provides a seal to prevent the pressure media from escaping out of pressure chamber 280. When pressure media is introduced into pressure chamber 280, the media acts against diaphragm 262, which is supported by plate 252. The pressure media, thus, urges plate 252 to move from the up position to the down position. Stem 276, being connected to plate 252, by way of down stop 216, actuates (opens or closes) valve 278 as plate 252 moves between the up and down positions. Diaphragm 262 is sized so that when plate 252 is in the down position, diaphragm 262 is generally smooth against the upward facing surface of plate 252. Indeed, when plate 252 is in the down position, which occurs when pressure media is at a high enough pressure to fully actuate valve actuator assembly 250, diaphragm 262 is fully supported. In this instance, fully supported means that the ID surfaces of housing 254 provide support against outward radial movement of the now vertical portions of diaphragm 262, and plate 252 provides support against downward movement of the portions of diaphragm 262 spanning the diameter of housing 254. Therefore, in the fully supported configuration, there is no span of diaphragm 262 that can balloon outward, in response to pressure media, without contacting and being supported by one of housing 254 and plate 252. Diaphragm 262 does not substantially extend axially below plate 252 in either the up or the down position.

Returning to the embodiment of FIGS. 1 and 2, in operation, the proper diameter of plate 160 is determined to provide the appropriate amount of down force at a given pressure of the pressure media. Plate 160 is assembled by connecting annular outer plate 166 to hub 164. In an embodiment, hub 164 is a standard size and outer plate 166 is available in a plurality of sizes so that the correct size can be selected. Housing 112 is similarly available in a plurality of sizes, and a size is selected so that ID surface 114 has an ID that is substantially equal to the OD of outer plate 166. Cap 130 is available in a plurality of sizes, and the size corresponding to the selected housing 112 is chosen. Finally, the size of diaphragm 210 is selected so that, when installed and plate 160 is in the fully down position, diaphragm 210 will be generally smooth against plate 160.

Bonnet 104 is connected to valve 102, with stem 106 protruding up from bonnet 104. Spring 234 is placed around stem 106, and down stop 216 is connected to stem 106. Plate 160 is assembled by connecting annular outer plate 166 to hub 164, with all appropriate seals in place. With the central orifice 214 of diaphragm 210 centered on plate 160, retainer 194 is tightened to compress diaphragm 210, thus forming a seal. Plate 160 is placed in housing 112, and the bolt holes of diaphragm 210 are aligned with bolt holes 126 of flange 120. Cap 130 is positioned on top of flange 120, and cap bolts 138 are tightened to compress the outer portion of diaphragm 210 between cap 130 and flange 120. The cavity defined by plate 160, ID surface 114, and cap 130 is defined as pressure chamber 190. Housing 112 is connected to bonnet 104 so that down stop 216 is concentrically positioned with retainer 194.

Spring 234 holds plate 160 in the up position. To actuate valve 102, pressure media is applied through inlet 140 at least until plate 160 moves downward to cause stem 106 to move downward, thus actuating valve 102. Diaphragm 210 prevents the pressure media from contacting the surface of plate 160. Plate 160 supports diaphragm 210 such that no part of diaphragm 210 can move axially below the upward facing surface of plate 160. In the outward radial direction, diaphragm 210 is supported by ID surface 114. Because diaphragm 210 does not extend downward below plate 160, there is no part of diaphragm 210 that is unsupported against inward or downward fluid force.

Actuator 100 can function with or without diaphragm 210 in place, or intact, provided that appropriate sealing arrangement is in position between cap 130 and housing 112. In the event that diaphragm 210 is not used, or is used but has one or more perforations allowing fluid to leak past it, plate 160 has a dynamic seal, such as sidewall seal 186, between the outer diameter of plate 160 and ID surface 114 of housing 112. Because of this seal, the pressurized fluid from inlet 140 causes plate 160 to move downward, and thus actuate valve 102, regardless of the status of diaphragm 210. Because diaphragm is fully supported at all times, the fluid pressure, or actuator operating pressure, can be as high as 250 psig. In embodiments, the fluid pressure can be greater than 250 psig. The fully supported nature of diaphragm 210 will allow maximum operating coverage to meet API 6A SSV design requirements.

While the invention has been shown or described in only some of its forms, it should be apparent to those skilled in the art that it is not so limited, but is susceptible to various changes without departing from the scope of the invention.

What is claimed is:

1. An apparatus for actuating a valve, the apparatus comprising:
    a cylindrical housing having a valve end, a cap end, and a sidewall defining an inner diameter ("ID") of the housing;
    a cap connected to the cap end of the housing with an inlet located in the cap;
    a plate positioned within the housing, the plate having a center portion and an outer diameter ("OD") that slidingly engages the ID of the housing, the OD of the plate being located axially nearer the valve end of the housing than the center portion, the plate moving between an extended position and a retracted position in response to pressure media from the inlet, the plate being nearer the valve end in the extended position than in the retracted position;
    an outer diameter sidewall seal located between the ID of the housing and the OD of the plate sealing all flow paths between the ID of the housing and the OD of the plate;
    a diaphragm, the diaphragm being fully supported by the plate and the housing when the plate is in the extended position;
    a retainer connected to the plate, the retainer operable to engage an inner diameter orifice of a the diaphragm; and
    a down stop in contact with the plate, the down stop being urged toward the valve end of the housing when the plate moves toward the extended position, and the down stop being operable to be connected to a valve stem for actuating a valve.

2. The apparatus according to claim 1, wherein the diaphragm covers the plate and extends to the cap end, the diaphragm and cap defining a pressure chamber.

3. The apparatus according to claim 2, wherein the diaphragm does not extend axially past the plate in each of the retracted and extended positions.

4. The apparatus according to claim 1, wherein the plate comprises a hub having a threaded outer diameter and a sealing plate having a threaded inner diameter, the sealing plate threadingly engaging the hub.

5. The apparatus according to claim 1, further comprising an indicator stem connected to the plate and protruding through an orifice of the cap.

6. The apparatus according to claim 1, wherein the plate comprises a convex surface and a concave surface, each of the convex and concave surfaces facing the cap and the concave surface being spaced radially outward from the convex surface.

7. The apparatus according to claim 6, wherein the diaphragm is in contact with each of the convex and concave surfaces when the plate is in the extended position.

8. The apparatus according to claim 1, wherein the plate does not extend axially past the cap end of the cylindrical body.

9. The apparatus according to claim 1, further comprising a retainer seal circumscribing an outer diameter of the retainer and sealing between the outer diameter of the retainer and an inner diameter of the plate.

10. The apparatus according to claim 1, further comprising:
    an outer diameter diaphragm seal formed by the diaphragm between the cap and the housing;
    a first inner diameter seal formed by the diaphragm between the retainer and the plate; and
    a second inner diameter seal formed by a retainer seal, the retainer seal being located on an opposite side of the diaphragm relative to the cap and circumscribing an outer diameter of the retainer, the retainer seal further forming a seal between the outer diameter of the retainer and an inner diameter of the plate.

11. An apparatus for actuating a valve, the apparatus comprising:
    a cylindrical housing having a valve end, a cap end, and a sidewall, the sidewall defining an inner diameter ("ID") of the housing;
    a cap connected to the cap end of the housing with an inlet located in the cap;
    a plate positioned in the housing, the plate having a center portion and an outer diameter ("OD") that slidingly engages the ID of the housing, the OD of the plate being located axially nearer the valve end of the housing than the center portion, the plate moving between an extended position and a retracted position in response to pressure media from the inlet, the plate being nearer the valve end in the extended position than in the retracted position;
    a down stop operatively connected to the plate such that the plate urges the down stop toward the valve end of the housing when the plate moves to the extended position, the down stop being operable to engage a valve stem;
    an outer diameter sidewall seal located between the ID of the housing and the OD of the plate sealing all flow paths between the ID of the housing and the OD of the plate;
    a retainer connected to the plate, the retainer being operable to engage a valve stem;
    a diaphragm having an outer diameter portion forming a seal between the cap and the housing and an inner diameter forming a seal between the retainer and the plate, the diaphragm being fully supported by the plate and the housing when the plate is in the extended position; and a retainer seal circumscribing an outer diameter of the retainer and spaced apart from the diaphragm, the retainer seal sealing between the outer diameter of the retainer and an inner diameter of the plate.

12. The apparatus according to claim 11, wherein the plate comprises a hub having a threaded outer diameter and a sealing plate having a threaded inner diameter, the sealing plate threadingly engaging the hub.

13. The apparatus according to claim 11, further comprising an indicator stem connected to the plate and protruding through the cap.

14. The apparatus according to claim 11, wherein the plate comprises a convex surface and a concave surface, each of the convex and concave surfaces facing the cap and the concave surface being spaced radially outward from the convex surface.

15. The apparatus according to claim 11, wherein the plate is concentric with the housing in each of the extended and retracted positions.

16. The apparatus according to claim 11, wherein:
a first outer diameter seal is formed by the diaphragm between the cap and the housing;
the outer diameter sidewall seal forms a second outer diameter seal;
a first inner diameter seal is formed by the diaphragm between the retainer and the plate; and
a second inner diameter seal is formed by a retainer seal, the retainer seal circumscribing an outer diameter of the retainer and sealing between the outer diameter of the retainer and an inner diameter of the plate.

17. An apparatus for actuating a valve, the apparatus comprising:

a cylindrical housing having a valve end, a cap end, and a sidewall defining an inner diameter ("ID") of the housing;

a cap connected to the cap end of the housing with an inlet located in the cap;

a plate connected to a down stop, the down stop being operable to be connected to a valve stem, the plate having a center portion and an outer diameter ("OD") that slidingly engages the ID of the housing, the plate moving between an extended position and a retracted position in response to pressure media from the inlet, and the plate not extending axially past the cap end of the housing;

a retainer connected to the plate, a diaphragm having an outer diameter portion forming a seal between the cap and the housing and an inner diameter forming a seal between the retainer and the plate, the diaphragm not extending axially past the plate in each of the retracted and extended positions; and an indicator stem connected to the plate and protruding through the cap.

18. The apparatus according to claim 17, wherein the plate comprises a hub having a threaded outer diameter and a sealing plate having a threaded inner diameter, the sealing plate threadingly engaging the hub.

19. The apparatus according to claim 17, further comprising a seal ring between the plate and the housing, wherein the seal ring forms a dynamic seal between the plate and the inner diameter surface of the housing.

20. The apparatus according to claim 17, further comprising a retainer seal circumscribing an outer diameter of the retainer on a portion of the retainer located on an opposite side of the diaphragm relative to the cap and, the retainer seal forming a seal between the outer diameter of the retainer and an inner diameter of the plate.

* * * * *